United States Patent [19]

Campbell

[11] Patent Number: 5,251,742
[45] Date of Patent: Oct. 12, 1993

[54] CONVEYOR INSTALLATION AND SHOCK ABSORBING ELEMENTS FOR USE THEREIN

[75] Inventor: Noel B. Campbell, Edmonton, Canada

[73] Assignee: CP Rubber, a Div. of Starcan Corporation, Nisku, Canada

[21] Appl. No.: 795,468

[22] Filed: Nov. 21, 1991

[51] Int. Cl.$^5$ ............................................. B65G 15/60
[52] U.S. Cl. ................................. 198/841; 198/842; 198/843; 267/153
[58] Field of Search ................. 198/841, 842, 843; 267/153

[56] References Cited

U.S. PATENT DOCUMENTS 3,211,278 10/1965 Arndt ................................. 198/843
4,822,011 4/1989 Goldbach et al. .............. 267/153 X

FOREIGN PATENT DOCUMENTS 3306793 8/1984 Fed. Rep. of Germany ...... 267/153
762571 11/1956 United Kingdom ................ 198/843

OTHER PUBLICATIONS

Sheets containing FIGS. 22-26 of "Conveyor Belt Installation Maintenance" by Georgia Duck & Cordage Mill, Scottsdale, Ga., undated, pp. 15 and 17.
A. B. Davey and A. R. Payne, "Buckled Columns", Rubber in Engineering Practice, 1964, pp. 4-6.
A. Syrotiuk and P. G. Howgate, "Buckling Energy Absorption and Management", pp. 12 and 13, from An Introduction to the Use of Elastomers for Deformation Energy Management, Rubber and Plastics Research Association of England. Letter and sketch from Skega Limited, North Bay, Ontario, dated May 31, 1990.
Trelleborg specification sheet and sketch showing impact bars and T-Bolt Fastening System, 2 sheets, undated.
Advertising sampler form Martin ® Conveyor Transfer Point Systems showing Guardabelt ® Impact Cradles, 2 sheets, undated.

*Primary Examiner*—Robert P. Olszewski
*Assistant Examiner*—Cheryl L. Gastineau
*Attorney, Agent, or Firm*—Fitzpatrick, Cella, Harper & Scinto

[57] ABSTRACT

A conveyor installation includes an endless belt wound around head and tail pulleys which extends between an impact station wherein material is placed on the belt and a drop off zone wherein the material is removed from the belt. Shock absorbers are disposed beneath the belt at the impact station to dissipate energy imparted on the belt by the material. In one embodiment, the belt is formed of flexible, textile reinforced material and the shock absorbers are in the form of a plurality of rectangular elements having a generally planar upper surface for supporting substantially the entire undersurface of the belt in the impact station. In another embodiment, the belt is formed of rigid steel reinforced material and the shock absorbers are in the form of a plurality of closely spaced rollers. In both embodiments, downstream of the impact station are located idler rollers for supporting the belt at spaced locations. The idler rollers are mounted on a support frame via shock absorbing elements in the form of rings. Each of the shock absorbing elements is formed of elastomeric material and has at least one passage formed therein and configured so that the body wall surrounding the passage is generally K-shaped in section and functions as a buckling element.

9 Claims, 10 Drawing Sheets

CONVEYOR INSTALLATION AND SHOCK ABSORBING ELEMENTS FOR USE THEREIN

FIELD OF THE INVENTION

The present invention relates to energy absorption and in particular to a conveyor installation upon which material is dumped and shock absorbing elements for use therein.

BACKGROUND OF THE INVENTION

Shock absorbers are well known in the art and are used in a variety of applications. In the automobile industry, pneumatic tires and springs together with snubbers are used to absorb energy so that less energy is imparted to the chassis of the automobile by the wheels rolling over the road. It is well known that the use of shock absorbers in this manner provides a much smoother ride.

In other environments, such as the mining industry, shock absorbers are used to prolong the life of equipment such as for example conveyors located at impact stations on which are carried by trucks is dumped. Conventional shock absorbing elements used at impact stations have typically been unsatisfactory as an insufficient amount of energy is absorbed by the elements. The result of this is that the underlying rigid structure of the conveyor at the impact station takes almost all of the applied load and this of course, substantially decreases the lifetime of the conveyor. For these reasons, alternative designs for shock absorbing elements which increase energy absorption while decreasing cost are continually being sought.

It is therefore an object of the present invention to provide a novel conveyor installation and novel shock absorbing elements suitable for use in a conveyor installation.

SUMMARY OF THE INVENTION

According to one aspect of the present invention there is provided a conveyor installation comprising:

transport means extending between an impact station wherein material is placed thereon and a drop off zone wherein said material is removed therefrom, and being operable to move said material between said impact station and said drop off zone; and shock absorbing means disposed beneath said transport means at said impact station to dissipate energy imparted on said transport means by said material, said shock absorbing means having a generally planar upper surface supporting substantially the entire undersurface of said transport means in said impact station, said shock absorbing means including at least one buckling element therein whereby said shock absorbing means exhibits the characteristics of a spring under loads having a magnitude less than a predetermined value and buckles until fully collapsed under loads having a magnitude greater than said predetermined value.

Preferably, the transport means includes an endless belt formed from flexible, textile reinforced material wound around head and tail pulleys and drive means for rotating at least one of the head and tail pulleys to move the belt between the impact station and the drop off zone. It is also preferred that the shock absorbing means is in the form of a plurality of shock absorbing elements arranged in rows and positioned such that the entire undersurface of the belt is supported.

Preferably, each shock absorbing element includes a body formed from energy absorbing material having an upper load bearing surface and a lower surface supported by a frame member with the body having a plurality of spaced, longitudinal passages provided therethrough extending the length of the body to define a plurality of body walls, the body walls constituting the buckling elements.

It is also preferred that the transport means further includes a plurality of idler rollers located at spaced locations between the impact station and the drop off zone for supporting the undersurface of the belt. Preferably the idler rollers are mounted on a frame via second shock absorbing elements with the second shock absorbing elements also being configured to function as buckling elements so that they exhibit the characteristics of a spring under loads having a magnitude less than a predetermined value, and buckle until fully collapsed under a load having a magnitude greater than the predetermined value.

In another aspect of the present invention there is provided a conveyor installation comprising:

an endless belt formed from rigid material wound around a head pulley and a tail pulley and extending between an impact station wherein material is placed on said belt and a drop off zone wherein said material is removed from said belt;

drive means to rotate one of said head and tail pulleys to move said belt between said impact station and said drop off zone; and a plurality of closely spaced rollers supporting the undersurface of said belt in said impact zone, each of said rollers having a generally cylindrical tubular body formed from elastomeric material with a plurality of circumferentially spaced, longitudinally extended passages provided therethrough to define a plurality of body walls, said body walls constituting buckling elements.

According to yet another aspect of the present invention there is provided a shock absorbing element including a body formed from energy absorbing material having a load bearing surface on one side of the body and another surface to be supported on the opposite side of said body and at least one passage formed through said body, the body wall surrounding said at least one passage constituting a buckling element so that said body exhibits the characteristics of a spring under loads having a magnitude less than a predetermined value and buckles until fully collapsed under loads having a magnitude greater than said predetermined value.

In one embodiment, the element is in the form of a ring with the body having only one passage provided therethrough. In another embodiment, the element is in the form of a generally rectangular impact slider. The impact slider includes a low friction member secured to the load bearing surface and a channel member secured to the surface of the body opposite the load bearing surface. A plurality of spaced, longitudinally extending passages are formed through the body with the body walls separating adjacent passages being generally K-shaped in section. In yet another embodiment, the body is in the form of a generally cylindrical roller having a plurality of circumferentially spaced, longitudinally extending passages formed therethrough. The body walls separating adjacent passages are also generally K-shaped in section.

The present invention provides advantages in that since the belt of the conveyor installation is supported in the impact station by shock absorbing elements which absorb a significant amount of typical forces applied to it, the belt and other rigid components of the installation exhibit a longer lifetime. This of course reduces costs and downtime associated with component failure.

BRIEF DESCRIPTION OF THE DRAWINGS

Embodiments of the present invention will now be more fully described with reference to the accompanying drawings in which:

FIG. 3 is a partial perspective view of a shock absorbing element in the form of an impact slider used in the installation shown in FIG. 1;

FIG. 4b is an enlarged view of a portion of the section shown in FIG. 4a;

DETAILED DESCRIPTION OF THE PREFERRED EMBODIMENTS

The present invention relates to shock absorbing elements suitable for use in conveyor installations and being formed of material which is capable of withstanding buckling forces and deformations without catastrophic collapse or failure. The ability of elastomers to undergo large deformations and recover has made them useful as buckling units. When functioning as a strut, elastomers act in a manner similar to a spring under an applied load until the applied load reaches the buckle point of the strut. At this time, the strut exhibits large compression for small increases in the applied load until the strut is compressed to the extent that it begins to exhibit the characteristics of a highly dense solid. After this, the strut exhibits practically no further compression regardless of increases in the applied load. Specific embodiments of designs for shock absorbing elements used in a conveyor installation and formed of material exhibiting the above-described characteristics will now be described.

Figure 1:
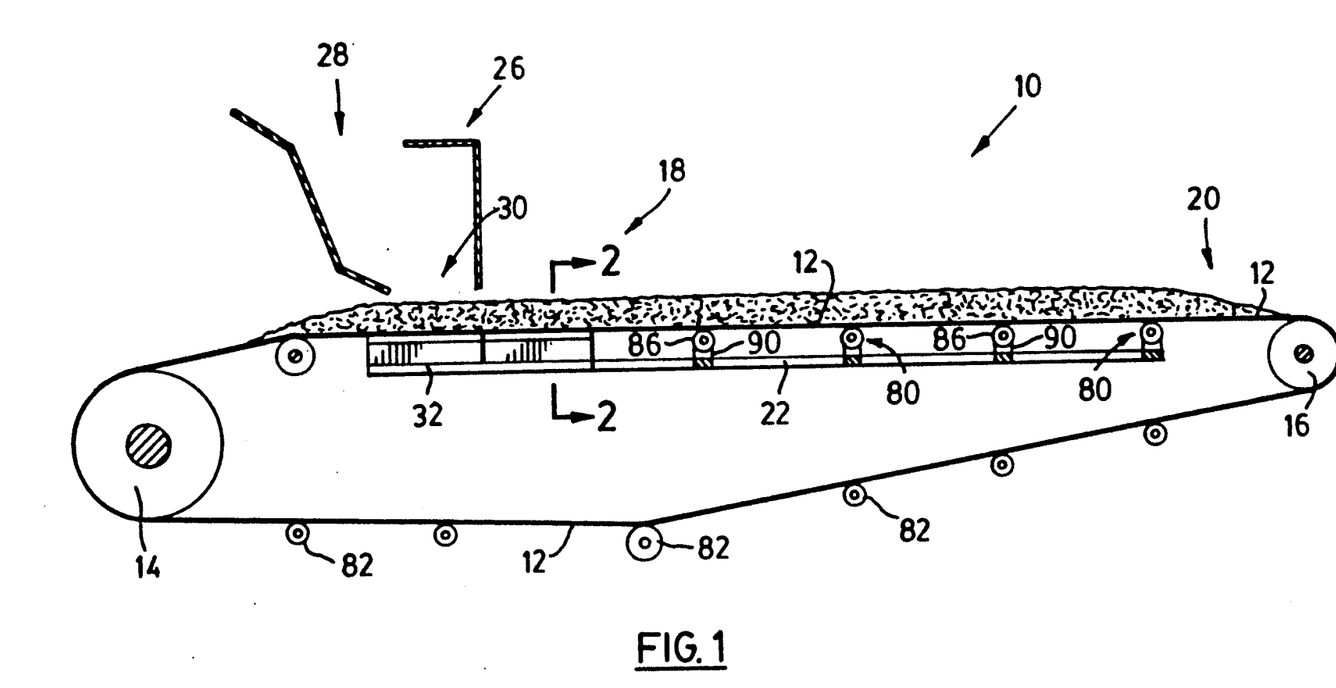
FIG. 1 is a sectional view of a conveyor installation taken along its central longitudinal axis.

Referring now to FIG. 1, a conveyor installation is shown and is generally indicated by reference numeral 10. The installation 10 includes an endless belt 12 formed of flexible, textile reinforced material which is wound around tail and head pulleys 14 and 16 respectively located at opposite ends of the installation 10. At one end of the installation adjacent the tail pulley 14 is located an impact station 18 wherein ore or other material is dumped onto the belt 12. The other end of the belt 12 adjacent the head pulley 16 constitutes a drop off zone 20 wherein material placed on the belt at the impact station is removed. A drive (not shown) is also provided to rotate one of the head and tail pulleys to move the belt 12 between the impact station 18 and the drop off zone 20.

Figure 2:
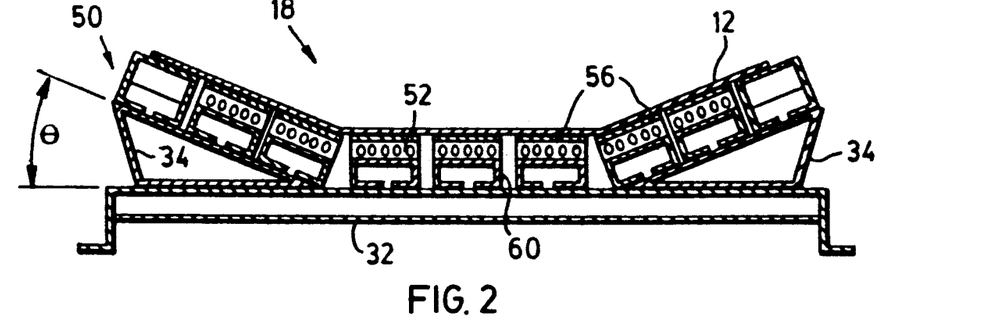
FIG. 2 is a sectional view of the conveyor installation shown in FIG. 1 taken along line 2—2.

A support frame 22 is positioned below the belt 12 and has mounted on it shock absorbing elements and rollers as will be described. In this embodiment, the conveyor installation 10 is of the Garland-type and therefore the belt is supported between the impact station 18 and the drop off zone 20 in a manner so that it forms a shallow U-shaped configuration (best shown in FIG. 2). This inhibits material placed on the belt 12 from falling off the side of the conveyor installation 10.

Looking at the impact station 18 there can be seen a chute 26 positioned above the belt 12 having an inlet 28 and outlet 30 downstream of the inlet. The chute 26 is designed to receive ore dumped from a truck or the like and direct it onto the belt 12. Beneath the belt in the impact zone 18, the support frame 22 includes a plinth 32 (see FIG. 2). Triangular wedges 34 are mounted along each side of the plinth 32 with the inclined faces 34a forming the hypotenuse of each wedge 34 facing each other. Secured to the faces 34a and the exposed upper surface of the plinth 32 are shock absorbing elements 50. The elements 50 are generally rectangular and are arranged in rows to define a planar surface which supports substantially the entire undersurface of the belt 12 in the impact station 18.

Figures 3, 4B:
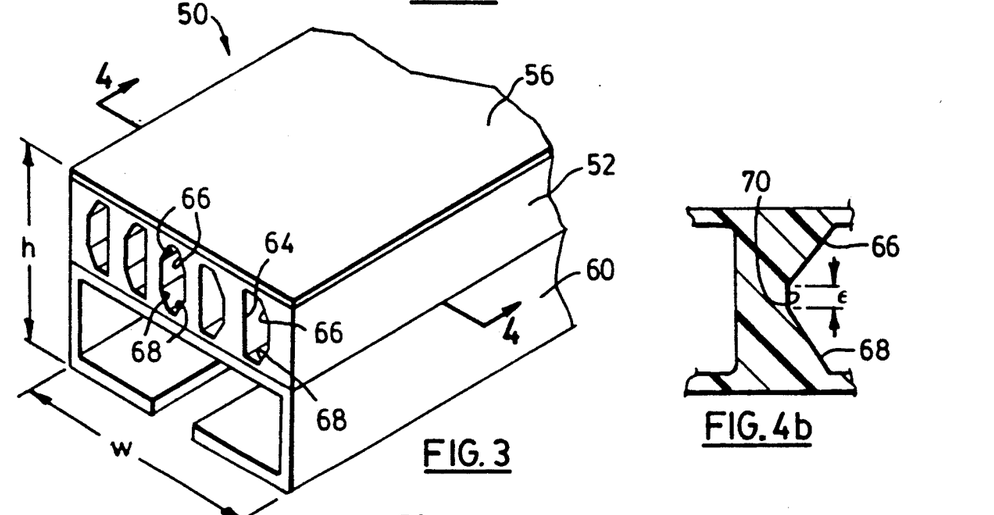
Figure 4A:
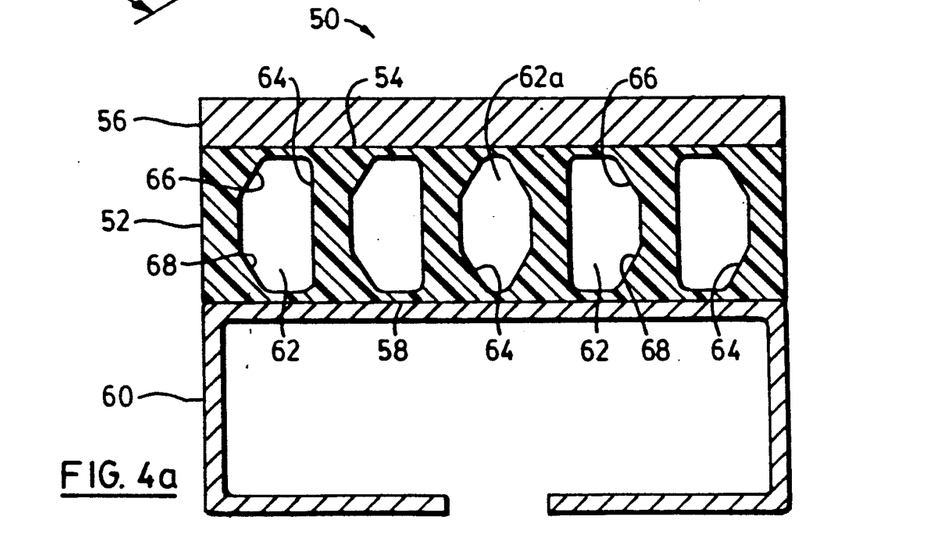
FIG. 4a is a section of the slider illustrated in FIG. 3 taken along line 4—4.

Referring now to FIGS. 3, 4a and 4b, one of the shock absorbing elements 50 is better illustrated. The element 50 is in the form of an impact slider and includes an energy absorbing body 52 formed of Urethane preferably in the form of polyether polyurethane. The body 52 has an upper load bearing surface 54 on which a planar low friction member 56 is secured. The body 52 also has a lower surface 58 which is supported by a steel channel member 60. A plurality of parallel, longitudinally extending passages 62, in this example five, are formed through the body 52 with one of the passages 62a extending along the central longitudinal axis of the slider 50. At least one inner side surface 64 of the body walls separating adjacent passages 62 includes a pair of oppositely inclined faces 66,68 bridged by a vertical face 70 to define a Euler buckling column $\epsilon$.

Figure 5:
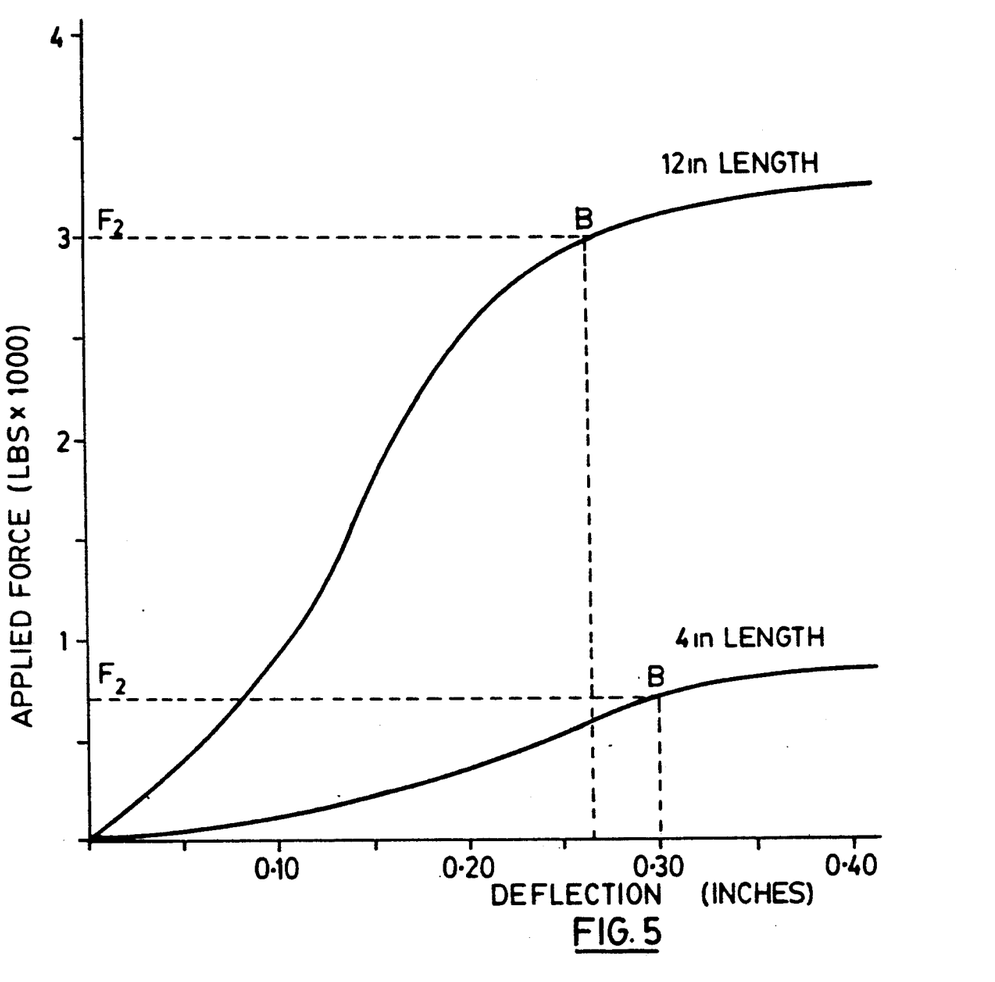
FIG. 5 shows performance curves of two impact sliders each having a different length.

In particular, both side surfaces 64 of the body defining passage 62a include oppositely inclined faces. The passages 62 on either side of the longitudinal axis include only one side surface having oppositely inclined faces. The other side surface of these passages is substantially vertical. The passage 62 configuration is such that the side surface of the body wall defining each passage which is furthest from the central longitudinal axis of the body 52 includes the oppositely inclined faces. Thus, the body wall on either side of each passage 62 is generally K-shaped in section. The body is also symmetrical about a vertical line intersecting the central longitudinal axis of the body. This body configuration ensures that compression of the impact slider 50 due to an applied load is directional with the upper surface 54 moving towards the lower surface 58 under the applied load with little lateral displacement of the two surfaces occurring. FIG. 5 shows compression curves of elements 50 having different lengths.

As can be seen from FIG. 5, the element 50 acts like a spring with a fixed spring constant while a force having a magnitude below $F_2$ is applied to it. When the applied load reaches point B of the curve, namely the buckle point of the Euler buckling columns ϵ, the element 50 compresses substantially for minimal extra force applied to its load bearing surface. Although not shown, as the applied load increases, the element 50 will continue to exhibit these characteristics until the Euler buckling columns ϵ completely collapse at which time the element 50 exhibits the characteristics of a dense solid. Once collapsed, the element exhibits little further compression for substantial increases in the load applied to the element.

When material is dumped on the belt 12 at the impact station 18 via the chute 26, the bodies 52 of the elements 50 become loaded under the impact forces. The bodies 52 in turn compress under the applied load in accordance with the characteristics illustrated in FIG. 5 by an amount dependent on the magnitude of the applied load and absorb some of the energy of the falling material. This reduces the load applied to the support frame 22. In addition, since the belt is supported along its entire undersurface in the impact station 18, the belt is prevented from undergoing any significant longitudinal elongation and this of course increases its lifetime. Once the load is removed, the elements 50 recoil to their original height.

Figure 6A:
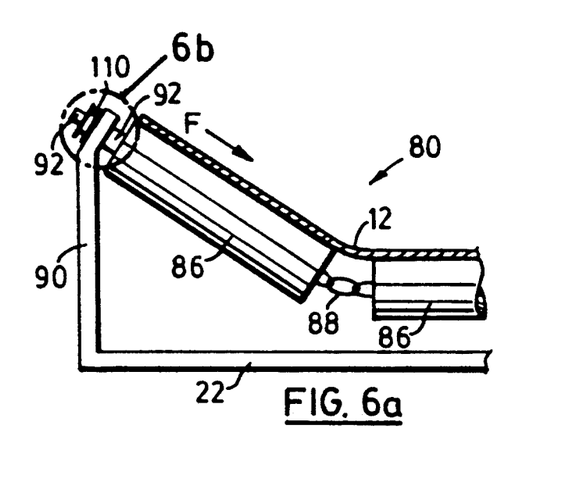
FIGS. 6a and 6b show another portion of the conveyor installation illustrated in FIG. 1.
Figure 6B:
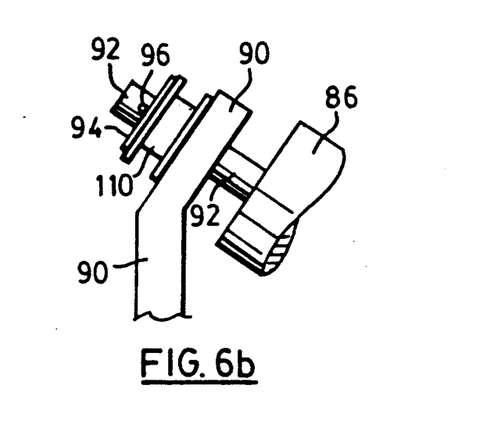

Between the impact station 18 and the drop off zone 20, idler roller sets 80 are used at spaced locations to support the undersurface of the belt 12. Idler rollers sets 82 are also used at spaced locations to support the belt 12 on its return trip from the head pulley 16 to the tail pulley 14. FIGS. 6a and 6b show a portion of the support frame 22 adjacent one idler roller set 80. As can be seen, each idler roller set 80 includes three idler rollers 86 which are interconnected via links 88 in a manner to permit independent rotation of each roller. The rollers are supported between a pair of uprights 90 mounted on the frame 22 and are arranged to maintain the U-shaped configuration of the belt 12. A suspension rod 92 extends outwardly from the outer two rollers 86 in each roller set 80 and passes through a bore in the upright 90. The rods 92 also pass through shock absorbing elements in the form of rings 110 and through buffer plates 94 overlying the rings. The rods 92 are maintained in position by retaining pins 96 passing through the rods 92.

Figure 7:
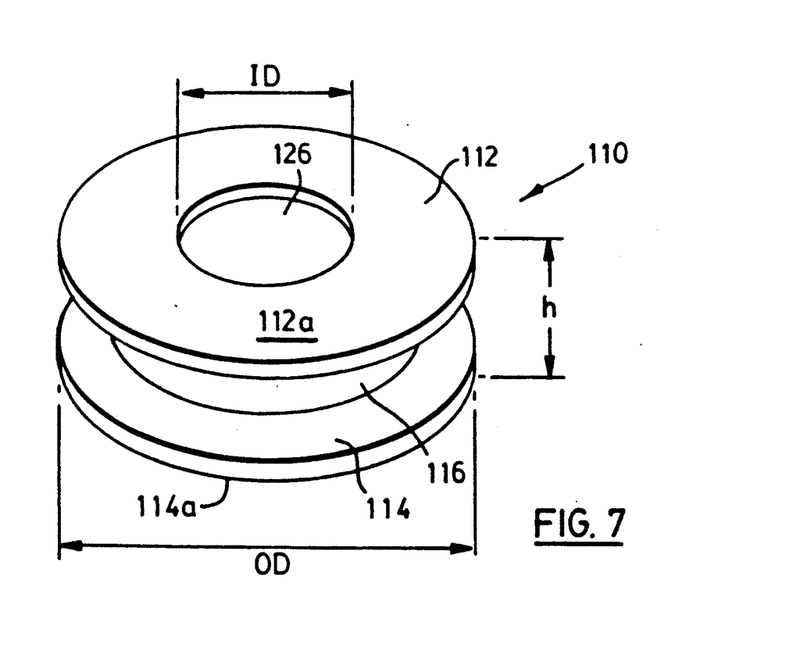
FIG. 7 is a perspective view of a shock absorbing element in the form of a ring used in the portion shown in FIGS. 6a and 6b.

Referring now to FIG. 7, one of the rings 110 is better illustrated. The ring 110 is of a one piece construction and is also formed of energy absorbing Urethane preferably in the form of polyether polyurethane. As can be seen, the ring 110 includes upper and lower flanges 112 and 114 having an outer diameter OD respectively separated by a generally cylindrical body 116 of height h. The outer surface 112a of one of the flanges functions as a load bearing surface and supports plate 94 while the outer surface 114a of the other flange functions as a support surface and rests on upright 90.

A passage 118 is formed in the body 116 between the flanges and is configured so that the interior side surface 120 of the body wall surrounding the passage 118 includes a pair of oppositely inclined faces 122, 124 separated by a vertical face 125 to define a Euler buckling column. Thus, when viewed in section, the body has a generally K-shaped configuration. Central apertures 126 of diameter ID are provided through the upper and lower flanges 112, 114 respectively and communicate with the passage 118 to allow the rod 92 to pass through the ring 110.

Figure 8A:
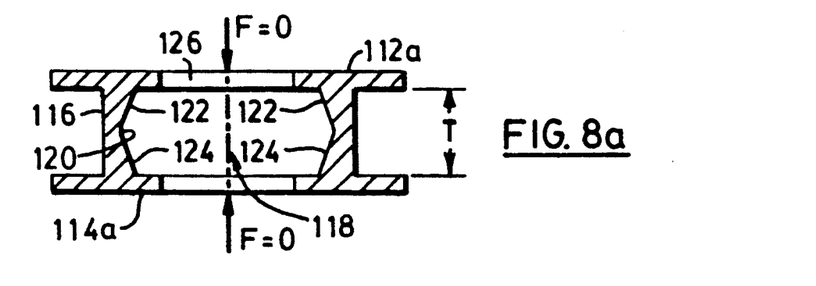
FIGS. 8a and 8c are sectional views of the ring shown in FIG. 7 in various degrees of compression.
Figure 8B:
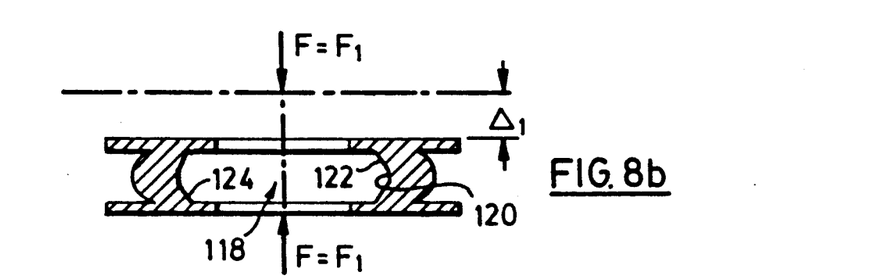
FIG. 8d shows a performance curve of the ring throughout the compression illustrated in FIGS. 8a to 8c.
Figure 8C:
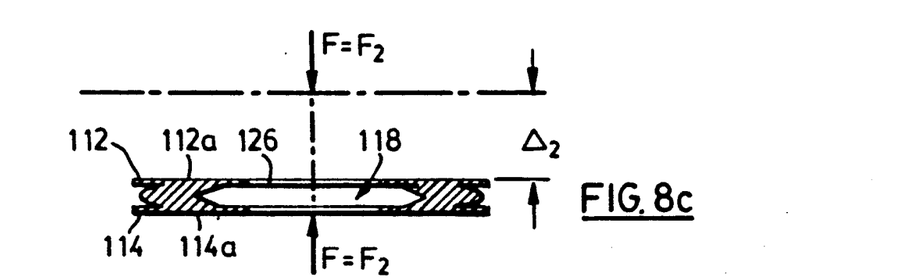
Figure 8D:
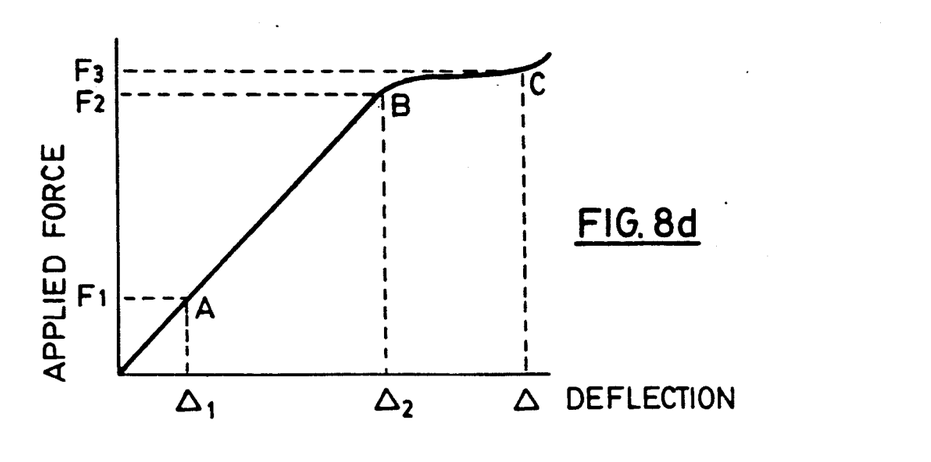

With particular reference to FIGS. 8a to 8d, the characteristics of the ring 110 under an applied load will now be described. When a force is applied to the rollers 86, it is transferred to the load bearing surface 112a of the ring 110 via the shaft 92 and buffer plate 94. Since the other surface 114a of the ring is supported on the outer rigid surface of the upright 90, the ring 110 compresses. The body wall 116 configuration is such that the compression of the ring is directional with the two flanges 112 and 114 moving toward one another with negligible lateral displacement of the flanges occurring. FIGS. 8a to 8c show the ring 110 in various stages of compression while FIG. 8d shows the compression curve of the ring undergoing the compression shown in FIGS. 8a to 8c.

As can be seen from FIG. 8d, the ring 110 acts like a spring with a fixed spring constant while a force less than $F_2$ is applied to it. When the applied load reaches point B of the curve, namely the buckle point of the ring, the ring 110 compresses in a manner with substantial compression of the ring occurring for minimal extra force applied to the ring. The ring 110 exhibits this type of characteristic until the ring compresses to the point indicated by reference C at which time, the ring 110 functions as a solid with minimal compression of the ring occurring despite increases in the force applied to the ring. Once the applied load is removed, the ring 110 recoils to its original form.

Figure 9A:
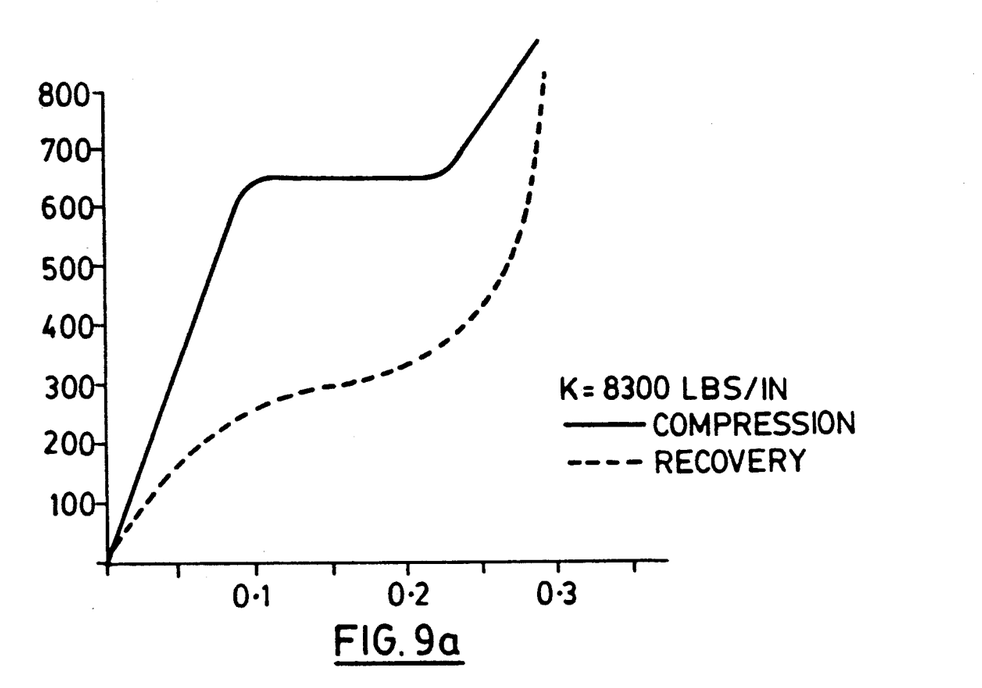
FIGS. 9a and 9b illustrate compression and recovery curves for two rings having different characteristics.
Figure 9B:
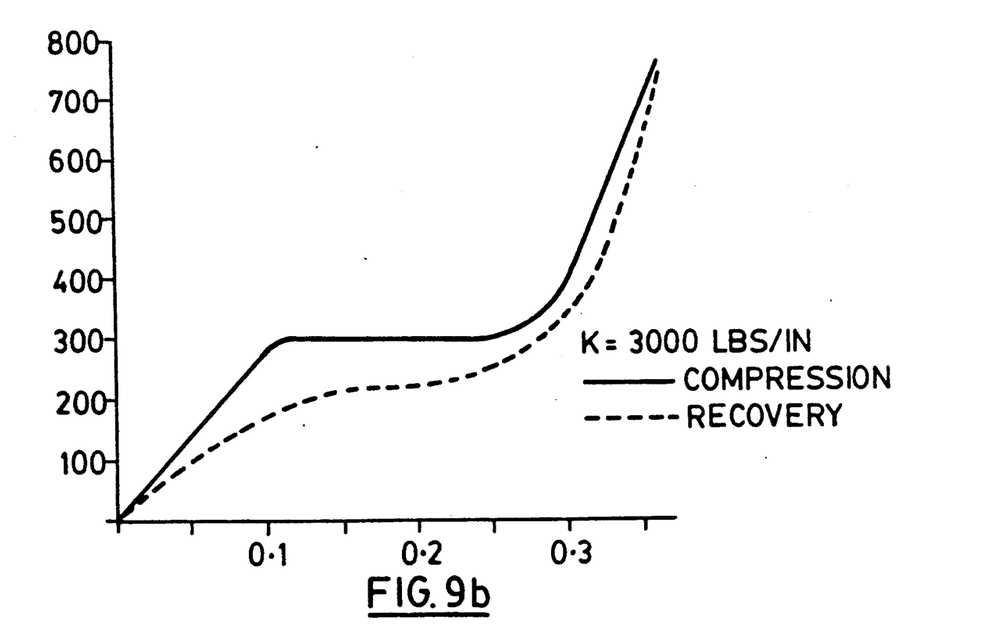
Figure 10:
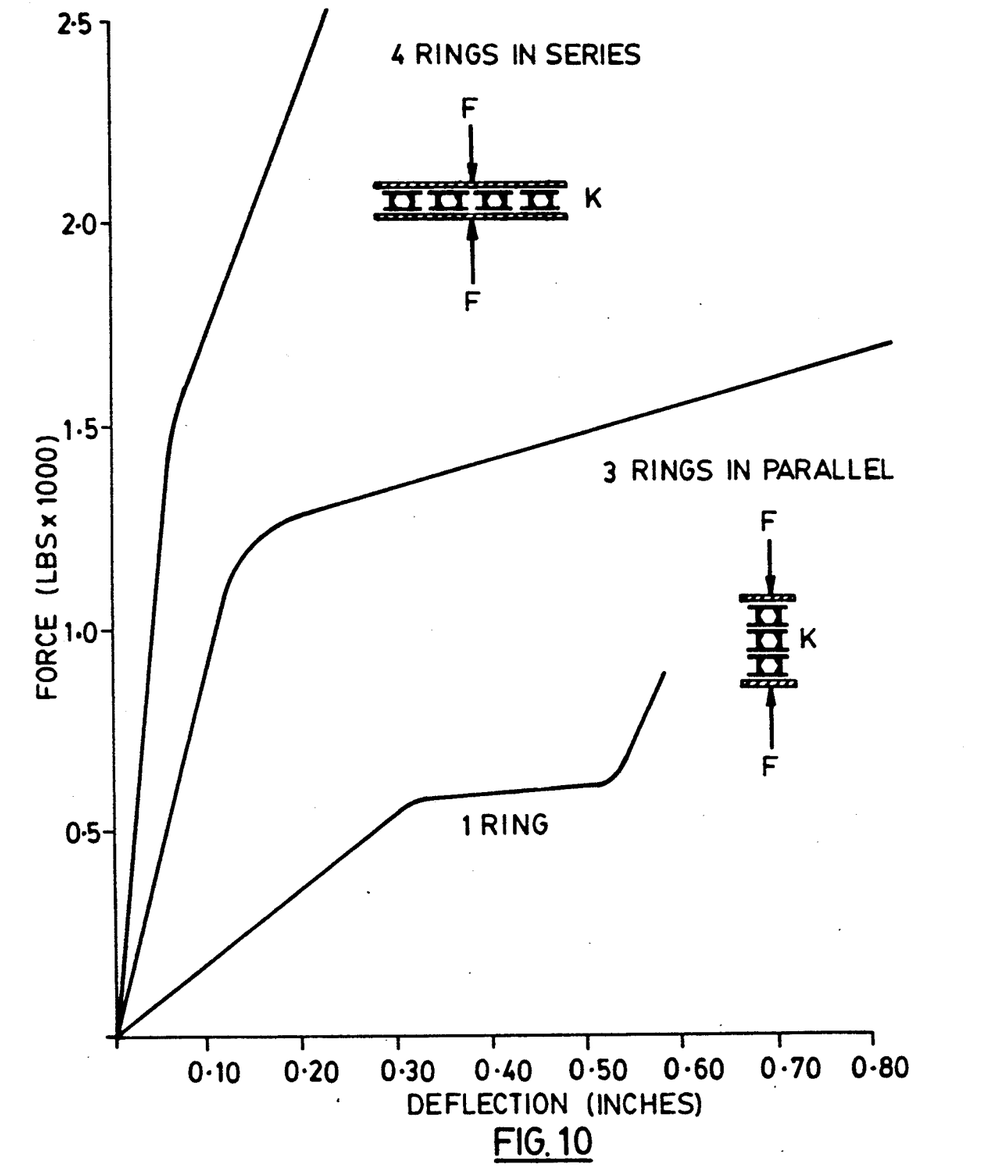
FIG. 10 shows compression curves for various configurations of rings.

FIGS. 9a and 9b show compression and recovery curves of two rings 110 having different spring constants due to the type of material used to form the ring. By changing the thickness and dimension of the body wall and the material used to form the ring 110, the compression characteristics of the ring can be altered to suit different environments. FIG. 10 shows a comparison of the compression curves of a single ring, three stacked rings and four laterally spaced rings subjected to various loads.

Figure 11:
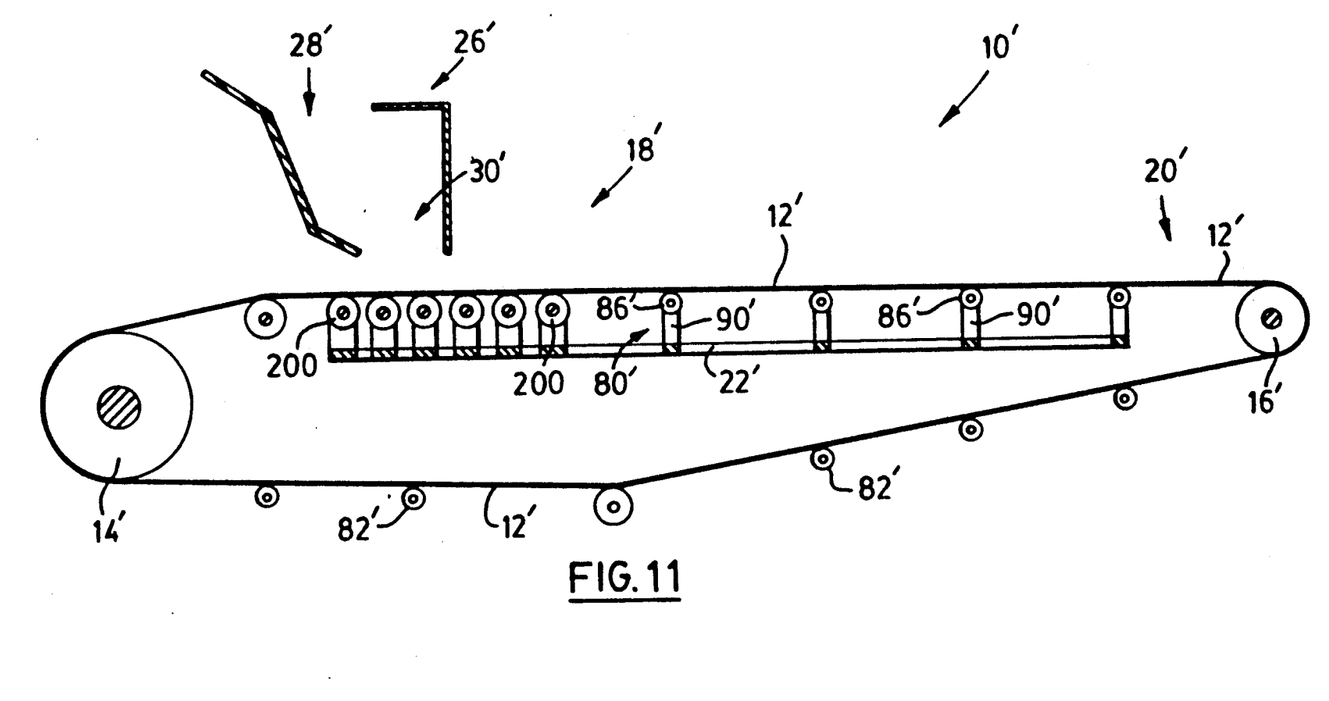
FIG. 11 is a sectional view of another conveyor installation taken along its central longitudinal axis.
Figure 12:
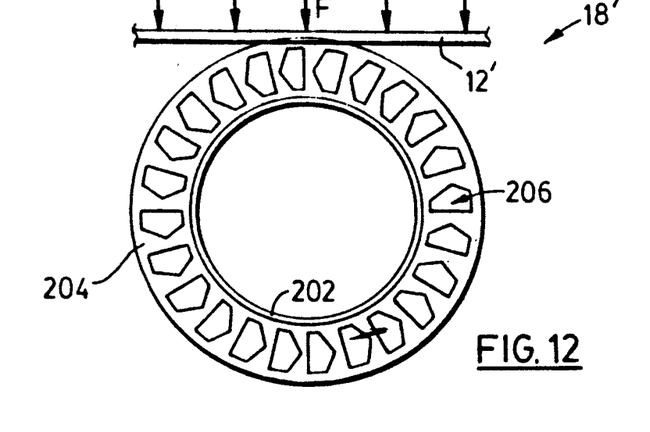
FIG. 12 is an enlarged view of a portion of the installation shown in FIG. 11.
Figure 13:
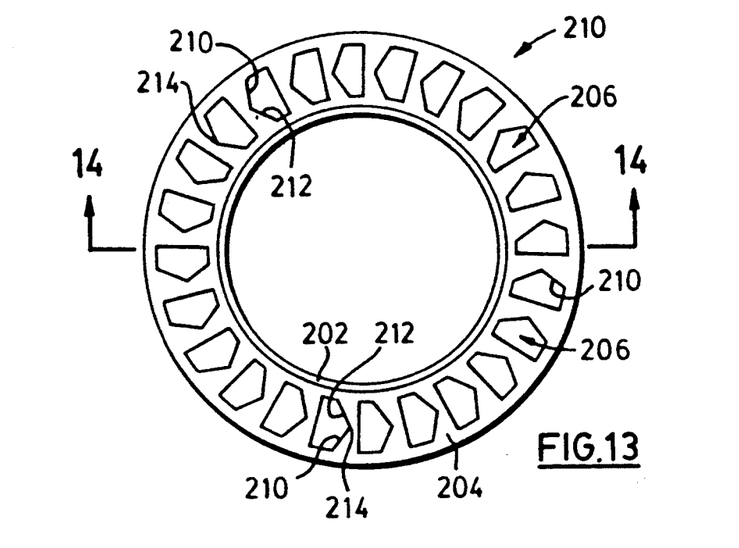
FIG. 13 is a side view of a shock absorbing element in the form of a roller used in the installation shown in FIG. 11.
Figure 14:
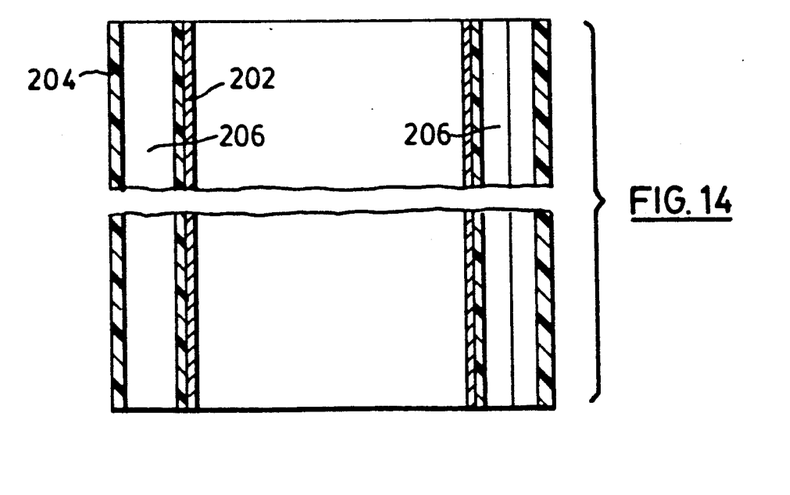
FIG. 14 is a section of the roller illustrated in FIG. 10 taken along line 14—14.
Figure 15:
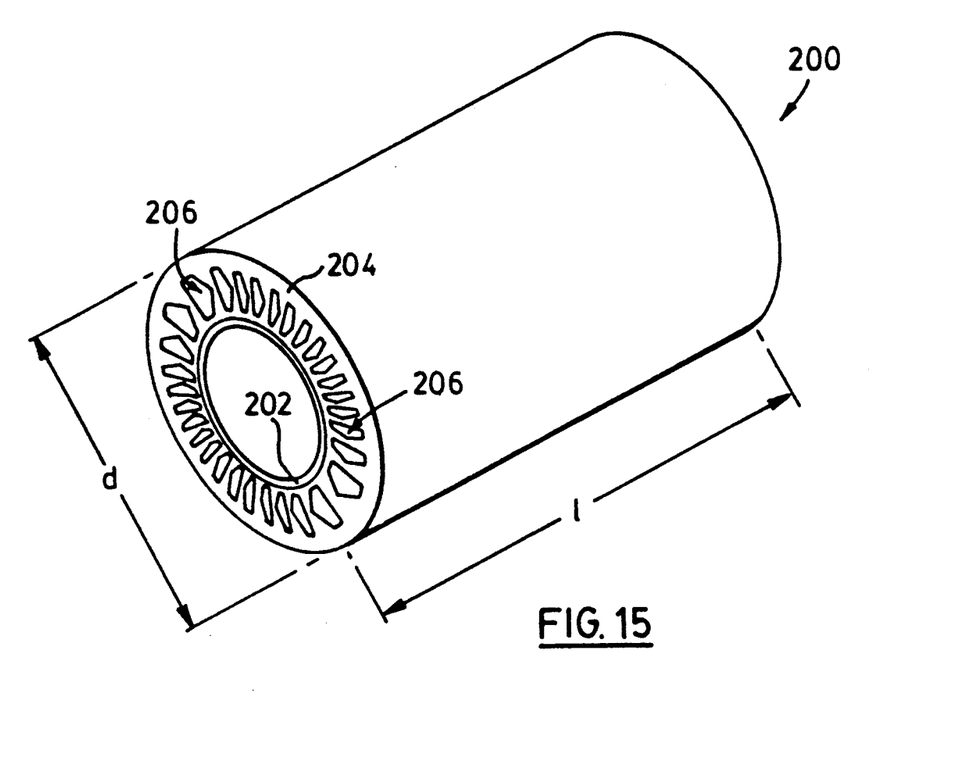
FIG. 15 is a perspective view of the roller shown in FIG. 13.

Another embodiment of a conveyor installation is shown in FIG. 11. In this embodiment like reference numerals will be used to indicated like components with a "'" added for clarity. In this installation, the belt 12' is formed of a rigid, steel reinforced material and does not undergo any noticeable longitudinal elongation when a load is placed on it. The belt 12' is planar and is supported between the impact station 18' and the drop off zone 20' at spaced locations along its length by generally horizontal idler rollers 86'. Rather than using the shock absorbing elements 50 at the impact station 18', a plurality of shock absorbing elements 200 are used. As can be seen, the elements 200 are in the form of closely spaced rollers. This is sufficient in that due to the nature of the belt 12', it will not deflect between the space separating each roller 200 as would occur if the belt 12 were used.

FIGS. 12 to 15 show one of the shock absorbing elements 200. The roller 200 includes a hollow, cylindrical steel tube 202 surrounded by a cylindrical body 204 formed of Urethane. Spaced, longitudinally extending passages 206 are formed through the body. The passages 206 are equidistantly spaced about the circumference of the body. One inner surface of the body walls separating each passage 206 has oppositely inclined faces 210 and 212 respectively bridged by a radially extending face 214. Thus, the body wall separating each passage is generally K-shaped in section to define a Euler buckling column ϵ. The same surface of each body wall includes the oppositely inclined faces.

Figure 16:
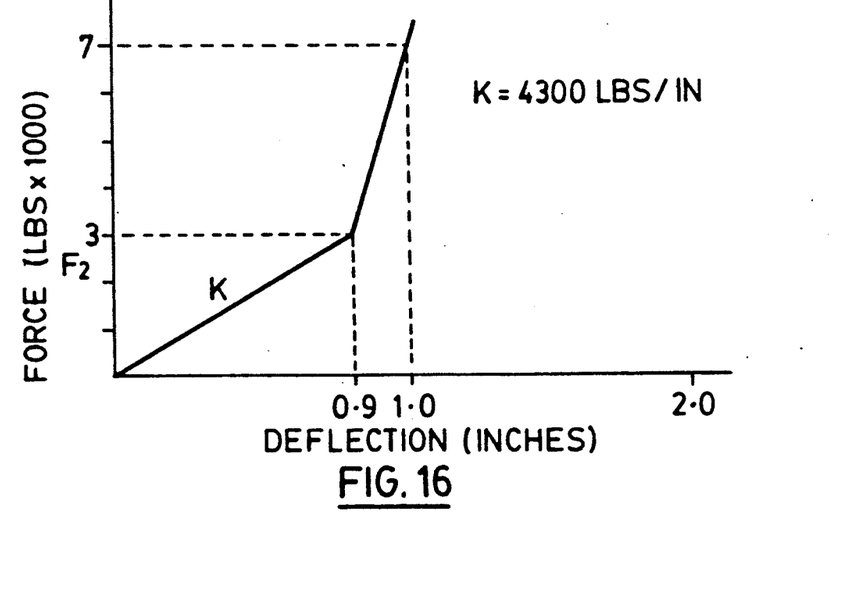
FIG. 16 shows a compression curve of the roller shown in FIG. 13.

Unlike the element 50 and ring 110, the configuration of the body walls in the roller 200 is different. In particular, the body configuration of the roller is such that the body wall separating each passage buckles in a counter-clockwise direction. This is different than the body walls located on opposite sides of the longitudinal axis of the elements 50 and 110 which buckle is opposite directions. Because of this, the compression curve of the roller 200 is different than the other elements and is shown in FIG. 16. As can be seen, the roller 200 acts like a spring when forces are applied to it having a magnitude less than $F_2$. At forces above $F_2$, the roller acts like a solid and exhibits little deflection despite large increases in the applied force.

Although the present elements have been described as being formed of Urethane, it should be apparent to one of skill in the art that other elastomers may be used which exhibit similar characteristics. It should also be realized, that the type of material selected to form the body of the elements depends on the environment in which the element is to be placed. For example, if colder environments are anticipated, polyether polyurethanes are suitable. However, if it is desired to use an element which is more abrasion resistant, polyester polyurethane may be a more suitable material.

We claim:

1. A conveyor installation comprising:
    an endless belt formed from rigid material wound around a head pulley and a tail pulley and extending between an impact station wherein material is placed on said belt and a drop off zone wherein said material is removed from said belt;
    drive means to rotate at least one of said head and tail pulleys to move said belt between said impact station and said drop off zone; and
    a plurality of closely spaced rollers supporting the undersurface of said belt in said impact zone, each of said rollers including a generally cylindrical support member and a generally cylindrical body of unitary construction formed of elastomeric material and surrounding said support member, said body having a plurality of circumferentially spaced, longitudinally extending passages provided therethrough to define a pair of concentric, generally cylindrical inner and outer members connected by a plurality of internal body wall members, each of said body wall members comprising a buckling element and having one side surface defining a wall of one passage and another side surface defining a wall of another passage whereby the one side surface of each of said body wall members is radially disposed and the another side surface of each of said body wall members presents an angle with respect to the radial direction, said body wall members being configured so that adjacent internal body wall members buckle in the same direction under an impact force.

2. A roller for use in a conveyor installation to absorb energy from an impact force applied thereto comprising:
    a generally cylindrical support member; and
    a generally cylindrical, tubular body of unitary construction formed of elastomeric material, said body surrounding said support member, said body having a plurality of circumferentially spaced, longitudinally extending passages provided therethrough to define a pair of concentric, generally cylindrical inner and outer members connected by a plurality of internal body wall members, each of said body wall members comprising a buckling element and having a generally radial side surface defining a wall of one passage and a generally K-shaped side surface defining the wall of another passage whereby said one side surface of each of said body wall members is radially disposed and said K-shaped side surface of each of said body wall members presents an angle with respect to the radial direction, said internal body wall members being configured so that adjacent internal body wall members buckle in the same direction under said impact force.

3. A roller as defined in claim 2 wherein said passages are equidistantly spaced about the circumference of said body.

4. A roller as defined in claim 3 wherein each of said K-shaped side surfaces includes a pair of diverging inclined faces bridged by a radially extending face.

5. A roller as defined in claim 2 wherein said tubular body is formed of Urethane.

6. A shock absorbing element to surround a roller in a conveyor installation, comprising:
    a generally cylindrical, tubular body of unitary construction formed of elastomeric material, said body having a plurality of circumferentially spaced, longitudinally extending passages provided therethrough to define a pair of concentric, generally cylindrical inner and outer members coupled by a plurality of internal body wall members, each of said body wall members comprising a buckling element and having one side surface defining a wall of one passage and another side surface defining a wall of another passage, said one side surface being radially disposed and said another side surface of each of said body wall members presenting an angle with respect to the radial direction, said body wall members being configured so that adjacent internal body wall members buckle in the same direction under an impact force.

7. A shock absorbing element as defined in claim 6 wherein one of said side surfaces is radially extending and the other of said side surfaces is generally K-shaped.

8. A shock absorbing element as defined in claim 7 wherein said passages are equidistantly spaced about the circumference of said body.

9. A shock absorbing element as defined in claim 8 wherein each of said K-shaped side surfaces includes a pair of diverging inclined faces bridged by a radially extending face.

* * * * *